United States Patent [19]

Purtell

[11] 4,352,460
[45] Oct. 5, 1982

[54] AUTOMATIC FURROW GUIDE

[75] Inventor: Rufus J. Purtell, Brownfield, Tex.

[73] Assignee: Tri-Matic, Inc., Brownfield, Tex.

[21] Appl. No.: 28,984

[22] Filed: Apr. 11, 1979

Related U.S. Application Data

[63] Continuation-in-part of Ser. No. 816,442, Jul. 18, 1977, abandoned.

[51] Int. Cl.$^3$ ................................................. B05B 3/18
[52] U.S. Cl. .................................... 239/184; 239/711; 239/720
[58] Field of Search .............. 239/177, 179, 184, 711, 239/720

[56] References Cited

U.S. PATENT DOCUMENTS

| | | | |
|---|---|---|---|
| 3,235,009 | 2/1966 | Nelson | 239/184 |
| 3,417,766 | 12/1968 | Purtell | 239/720 |
| 3,444,941 | 5/1969 | Purtell | 239/183 |
| 3,575,200 | 4/1971 | Imeson | 239/183 |
| 3,590,869 | 7/1971 | Von Lowe | 239/711 |
| 3,710,818 | 1/1973 | Imeson | 239/183 |
| 3,785,564 | 1/1974 | Baldocchi | 239/184 |
| 3,844,308 | 10/1974 | Purtell | 239/720 |
| 3,942,722 | 3/1976 | Ede | 239/183 |
| 3,970,102 | 7/1976 | Harvey | 239/183 |
| 3,972,477 | 8/1976 | Laureau | 239/183 |
| 3,984,052 | 10/1976 | Di Palma | 239/183 |
| 4,159,080 | 6/1979 | Stondal | 239/183 |
| 4,172,556 | 10/1979 | Stondal | 239/183 |
| 4,185,774 | 1/1980 | Tidwell | 239/184 |

FOREIGN PATENT DOCUMENTS

| | | | |
|---|---|---|---|
| 2402916 | 7/1974 | Fed. Rep. of Germany | 239/183 |
| 253459 | 7/1926 | United Kingdom . | |
| 1473065 | 5/1977 | United Kingdom . | |

*Primary Examiner*—A. Michael Chambers
*Attorney, Agent, or Firm*—Wendell Coffee

[57] ABSTRACT

A furrow guide on one end of the moving pipe of an irrigation system determines the horizontal distance from the end of the pipe to a furrow. The determination of this horizontal distance is used to control functions of the irrigation system such as to guide the direction of travel of the traveling pipe. Also, the furrow guide is used with an automatic irrigator to guide the valve opener to the valve. The automatic irrigator has all elements operating automatically, including the starting of the engine and the complete movement of the system.

27 Claims, 12 Drawing Figures

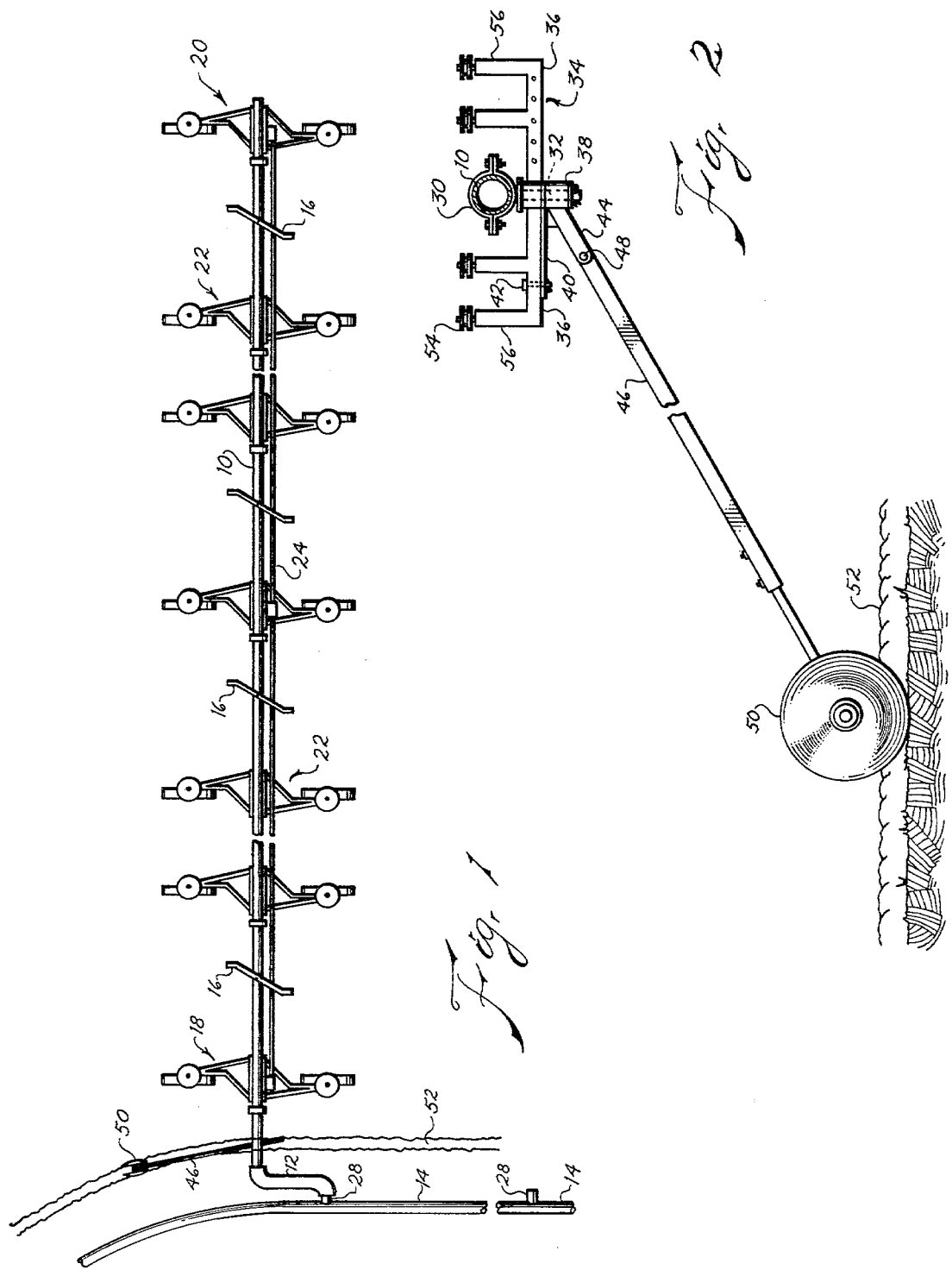

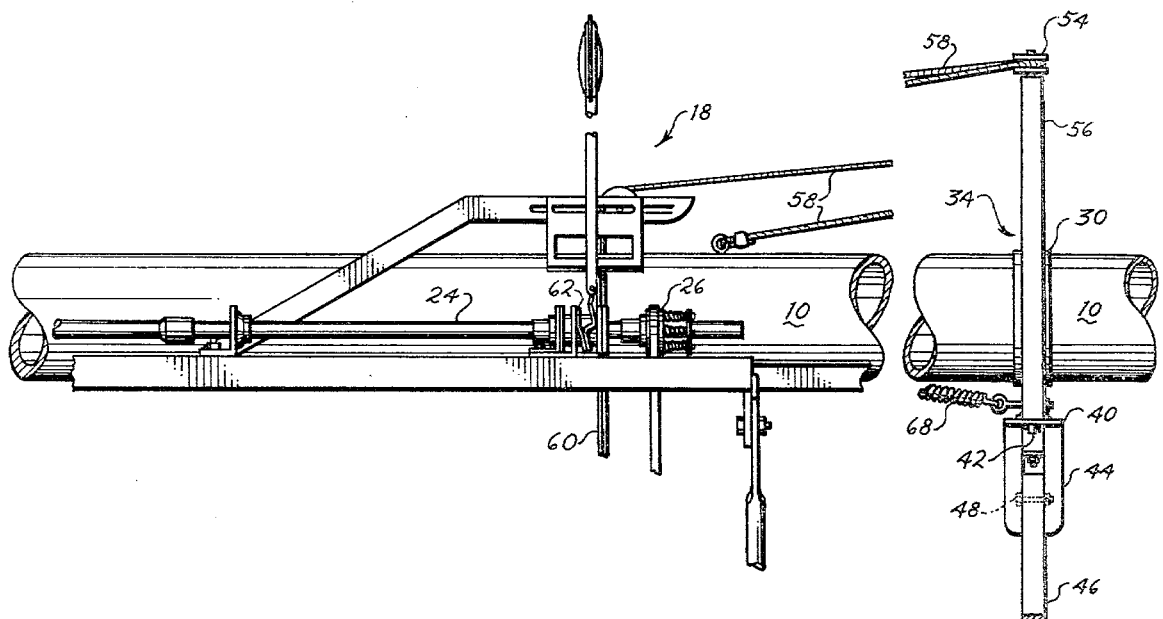
Fig. 3
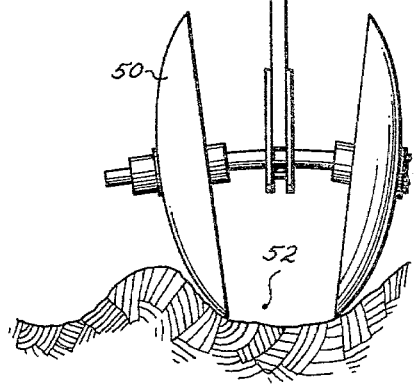
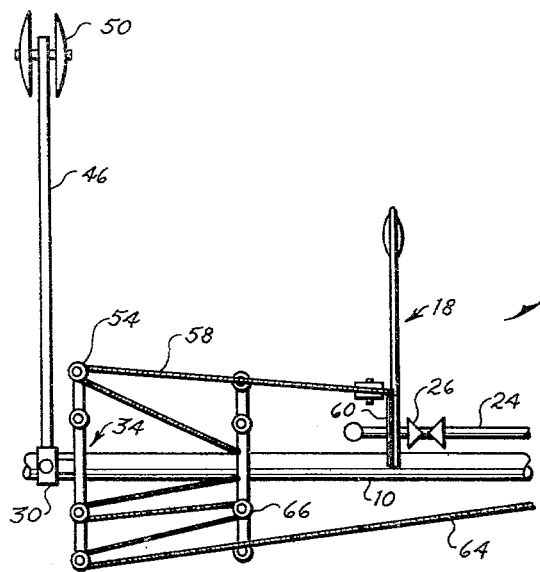
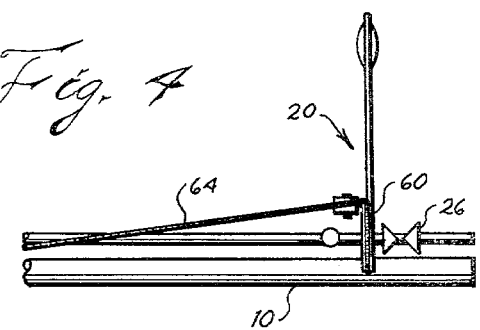
Fig. 4

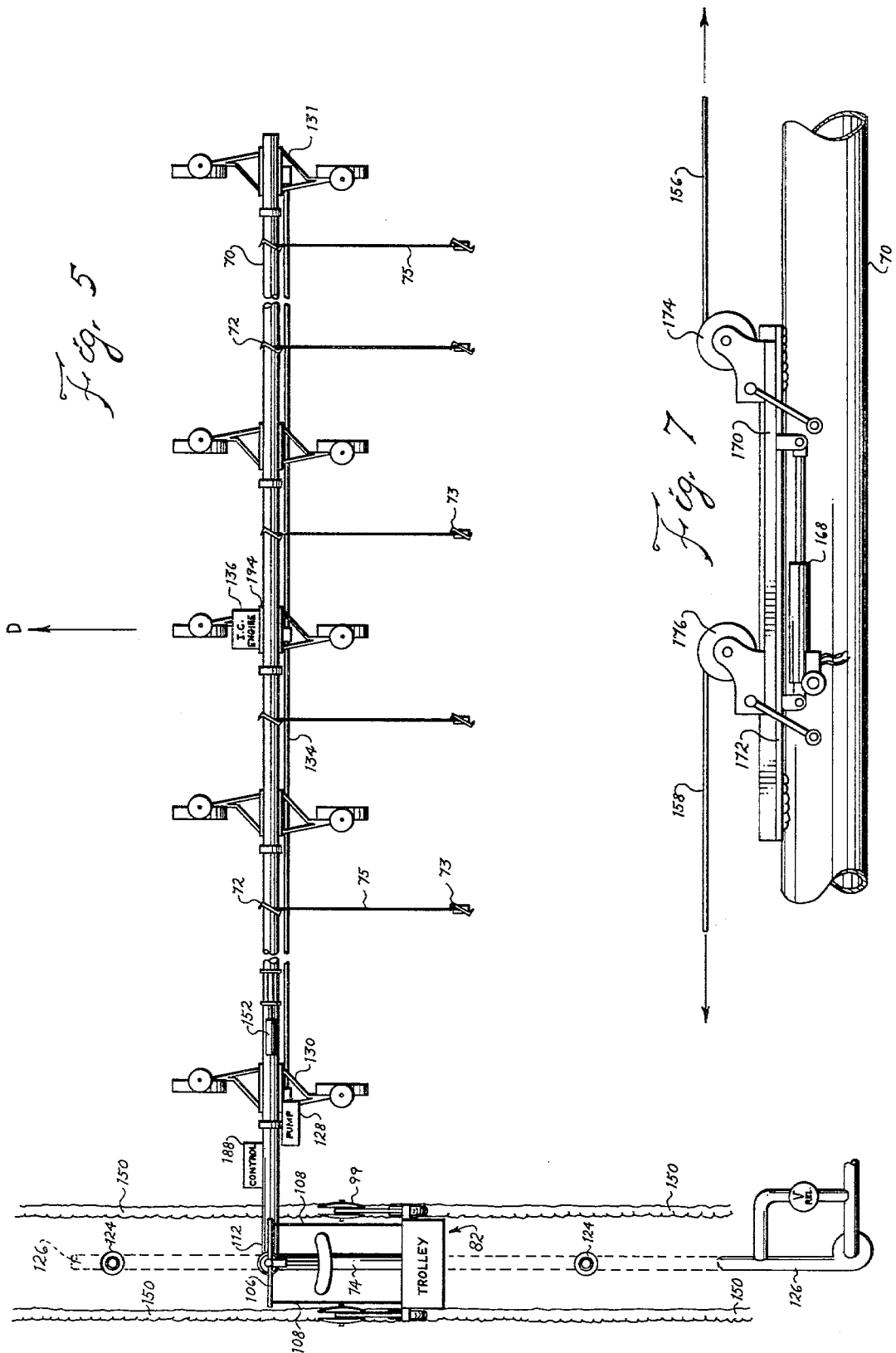

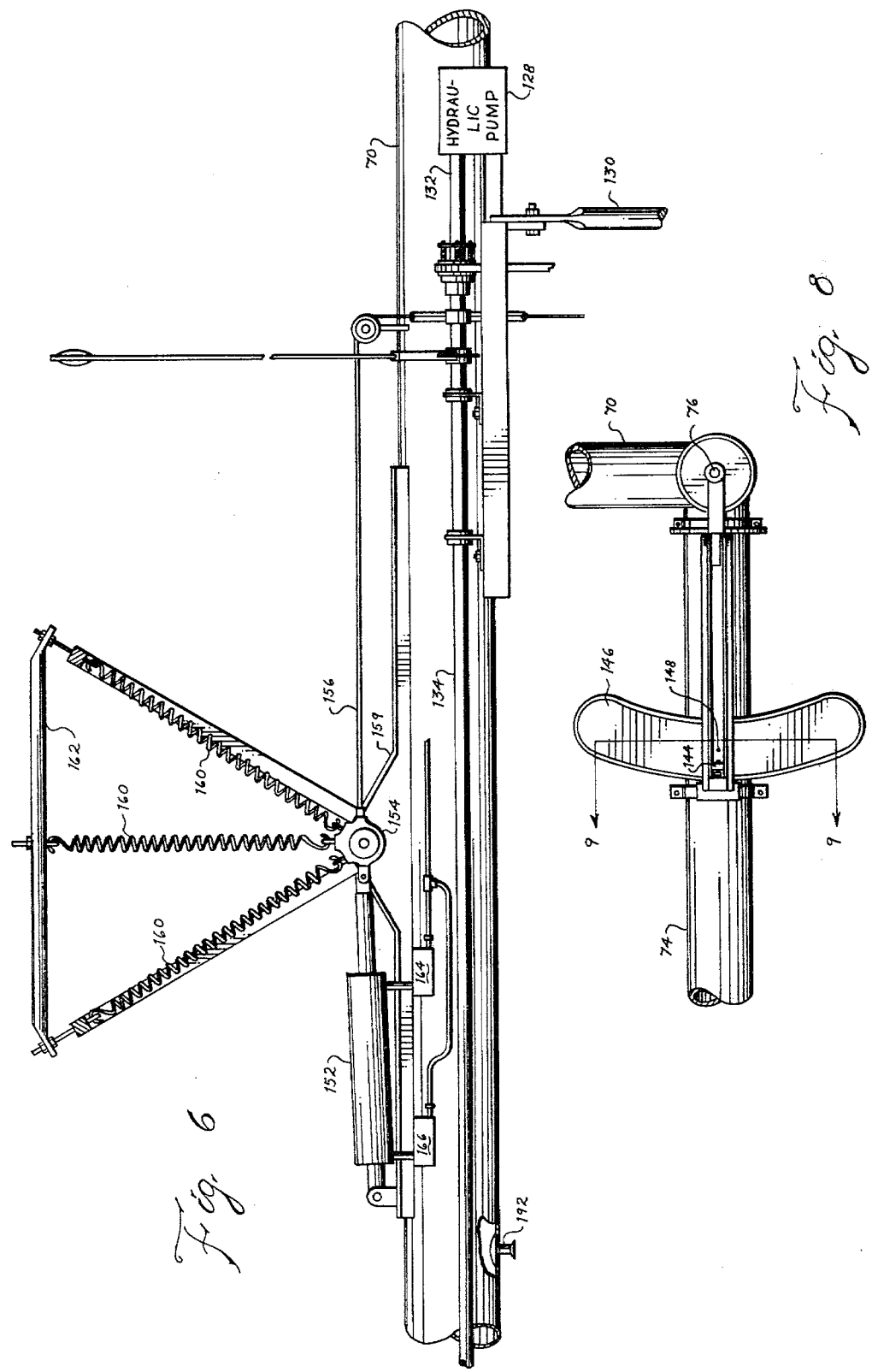

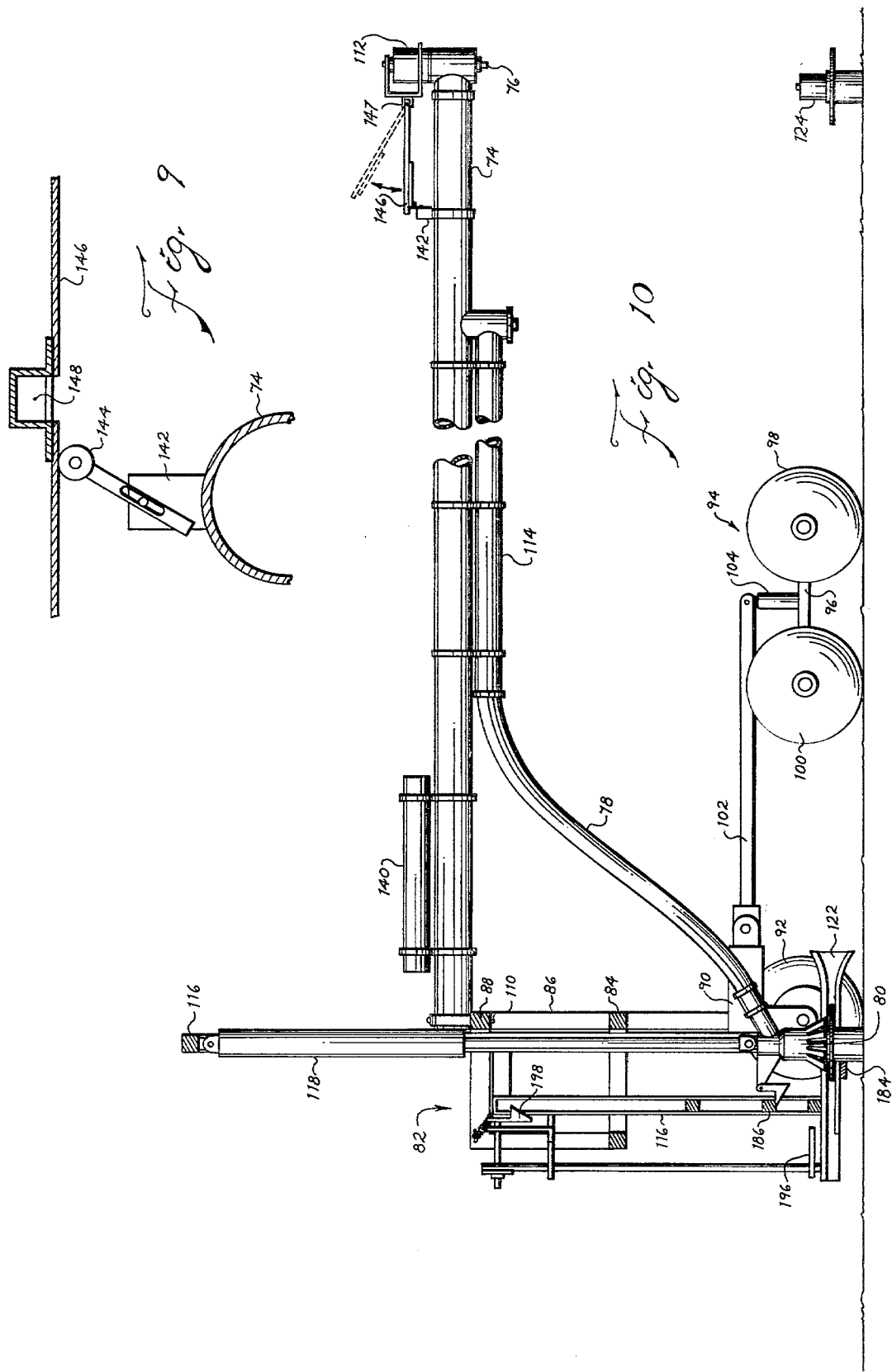

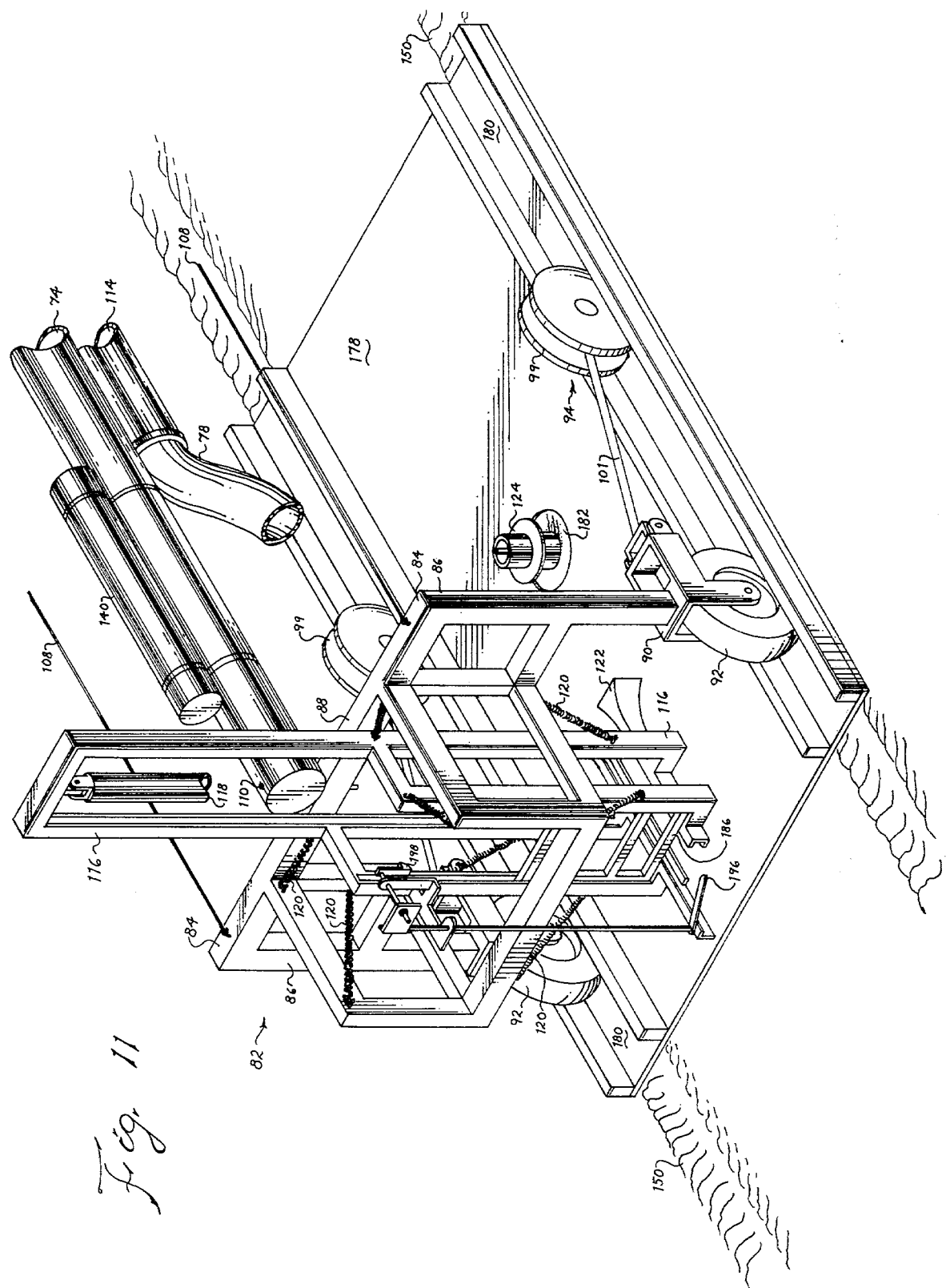

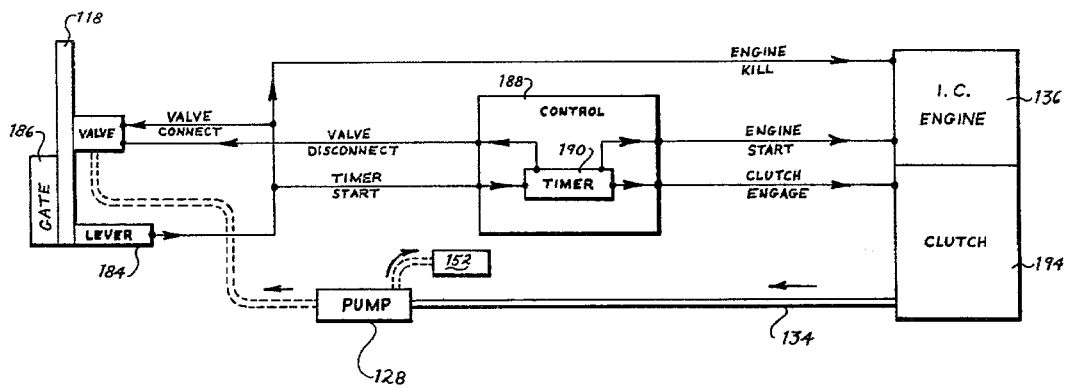

4,352,460

AUTOMATIC FURROW GUIDE

CROSS REFERENCE TO RELATED APPLICATIONS

This is a continuation-in-part of my prior application entitled Furrow Guide for Irrigation Systems, filed July 18, 1977, Ser. No. 816,442, now abandoned.

BACKGROUND OF THE INVENTION (1) Field of the Invention

This invention relates to agricultural irrigation and more particularly to an irrigation system having a pipe which moves laterally.

(2) Description of the Prior Art

Furrow guides for tractors used for agricultural purposes are old and well known. These furrow guides include a pair of discs which are attached to a leg which are attach to the front wheels or steering mechanism of the tractor. Therefore, if they are placed in the furrow, they will cause the tractor to be faithfully guided along the furrow. With the tractor following the furrows, there would be no need for the operator to constantly maintain and steer the tractor manually.

My prior U.S. Pat. No. 3,417,766, discloses a means for automatically maintaining the intermediate vehicles of an irrigation system in alignment between the end vehicles. The system is driven by a shaft extending along the side of the elongated pipe and any mis-alignment would result in the change of the length of the shaft. This change in the length of the shaft is used to vary the effective diameter of variable diameter sheaves so that a mis-aligned vehicle is either speeded up or slowed down.

My prior U.S. Pat. No. 3,844,308, discloses a dirigible irrigation system. In it, by manually changing a cable, the effective diameter of variable diameter sheaves on the end vehicles was changed. The other vehicles being aligned between the end vehicles and, therefore, the angle of travel of the entire system could be changed by this manual correction.

McMurray, U.S. Pat. No. 3,726,478, discloses a system whereby the speed of the end vehicles was controlled by a trolley which followed a concrete curb along the edge of a permanent canal in the field. The distance between the curb and the end of the vehicle was determined and the speed of the end vehicle was changed so as to change the angle of the pipe, thus, maintaining the end of the pipe a fixed distance from the curb.

Christensen et al., U.S. Pat. No. 3,979,062, discloses an irrigation system which moves in a circle around a center pivot. In order to irrigate corners of a field, a wire is buried adjacent to the perimeter of the circle and by different positions of the wire, signals are given to control a function of the irrigation system, namely, to water the corner.

My prior U.S. Pat. No. 3,444,941, discloses an automatic irrigator wherein a special vehicle straddling the permanent supply pipe to connect to each valve on the supply pipe to furnish water to the moving pipe.

In the prosecution of the parent application, the Examiner made of record Lundegreen U.S. Pat. No. 2,744,785, Nelson U.S. Pat. No. 3,235,009 and Baldocchi U.S. Pat. No. 3,785,564; however, applicant does not consider them as pertinent as the specific prior art as discussed above.

SUMMARY OF THE INVENTION (1) New and Different Function

I have invented a system whereby a temporary furrow is plowed along one end of the path of the irrigation pipe. A furrow guide in the furrow is pivoted to the end of the pipe. The angle of the leg of the furrow guide to the pipe will determine the distance from the end of the pipe to the furrow. Therefore, any of the several of the functions of the system can be controlled from this measurement. Specifically, the speed of the end vehicles can be controlled as does McMurray. However, in my invention the furrow is readily removed for other agricultural purposes. I.e., as soon as the irrigation of one area of land is completed, the furrow can be leveled by equipment available to all farmers and agricultural practices continued without any obstruction from the furrow.

In any event, the end of the moving pipe can be very closely regulated to the fixed pipe so that with automatic operation the connection to the water at the valves on the fixed pipe is readily accomplished. It will be understood that for automatic operation of the connection of the pipe to the valves that there must be accurate registration or alignment between the valve connector and the valve.

It will be emphasized that since the system has its own power, as explained in the prior art, the system may be moved almost anywhere. I.e., if it is desired to move it from one field to another, all that is necessary is to plow a furrow to wherever it is desired to move the system, put the furrow guide in the furrow and move it. It is not necessary to have water to furnish power or to have a permanent guide.

A rotating shaft, used upon irrigation systems such as according to my prior patents, is used to drive a hydraulic pump located in the end of the pipe so that hydraulic fluid under pressure is readily available at that point to supply power to the automatic system.

Thus, it may be seen that within my invention, I have combined parts to accomplish a function which is far in excess of the sum of the functions performed by the individual parts such as furrow guides, variable diameter sheaves, cables, pulleys and the like.

(2) Objects of this Invention

An object of this invention is to irrigate farm land by evenly distributing water on the land.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a plan view of an irrigation system according to my invention with some parts omitted and other parts schematically shown and with the pipe foreshortened and broken for clarity of illustration.

FIG. 2 is an end view of the furrow guide attached to the pipe.

FIG. 3 is a front elevational view of the furrow guide and a portion of the mechanism of the end vehicle with parts broken away for clarity.

FIG. 4 is a top plan view of the two ends of the system showing the speed change mechanism of both ends with some parts schematically shown.

FIG. 5 is a plan view of an automatic irrigation system according to my invention with some parts omitted and other parts schematically shown and with the pipe foreshortened and broken for clarity of illustration.

FIG. 6 is a rear elevational view of a portion of the mechanism to change the direction of the system, according to the embodiment shown in FIG. 5.

FIG. 7 is an elevational view of an alternate means for changing direction of the pipe responsive to signals received from the furrow guide, according to the embodiment shown in FIG. 5.

FIG. 8 is a top plan view of the equipment to detect the distance of the end pipe from the furrow, according to the embodiment shown in FIG. 5.

FIG. 9 is a sectional view taken substantially on line 9—9 of FIG. 8, however, with the equipment shown in a different position.

FIG. 10 is a side elevational view, with parts foreshortened, of the trolley connected to the pipe, with a different embodiment of the furrow guide, according to the embodiment of FIG. 5.

FIG. 11 is a rear perspective view of the trolley approaching a valve, according to the embodiment of FIG. 5.

FIG. 12 is a schematic representation of the controls and operation of the embodiment of FIG. 5.

DESCRIPTION OF THE PREFERRED EMBODIMENTS

Referring to the drawing, FIGS. 1–4, there may be seen represented an agricultural irrigation system. Typically, a system includes elongated moving pipe 10. Means for supplying the pipe with water under pressure in the form of hose 12 is connected to the pipe. The hose is also connected to supply pipe 14. The moving pipe 10 has a plurality of sprinklers 16 thereon which form the means for dispensing water from the pipe 10 upon the land to be watered.

The pipe 10 is supported by a plurality of vehicles. These vehicles include pipe end vehicle 18, far end vehicle 20, and a plurality of intermediate vehicles 22. Each of the vehicles 18, 20 and 22 are driven by elongated drive shaft 24 through variable diameter sheaves 26. Means are provided which include the drive shaft and the variable diameter shafts to maintain all of the intermediate vehicles in line between the two end vehicles. Typical of this means is my U.S. Pat. No. 3,417,766. My U.S. Pat. No. 3,844,308 discloses the speed of the end vehicles 19 and 20 is controlled by a cable moving the variable diameter sheaves so that their effective diameter is changed.

It will be understood that the system as described has a plurality of functions and that it follows a pattern in performing these plural functions. I.e., after one portion of a farm is watered, the water in the supply pipe 14 is shut off and the hose 12 disconnected. Then automatic drain valves (not shown but well known in the art) drain the pipe. Thereafter, a motor is started and the pipe travels transversely of its length so that one end follows a path. By controlling the speeds of the end vehicles, the angle of the pipe can be changed. Of course, by changing the angle of the pipe, the pipe can be caused to move closer or further from the supply pipe 14 whereon a plurality of valves 28 are located. After the pipe has moved forward from one valve 28 to the next, another function of the system is to stop the movement of the vehicles and the elongated pipe, reconnect the hose to the next valve 28, repressurize the supply of water in the supply pipe 14 and supply the water to the elongated pipe 10 at which time the drain valves automatically close and the system begins sprinkling again.

Those skilled in the art will recognize that the various functions described above are typical functions of a lateral move vehicle supported irrigation system. Other irrigation systems having elongated pipes will follow different patterns of functions. E.g., a center pivot type irrigation system will follow its own pattern of functions which will include the pipe which corresponds to elongated pipe 10 traveling so that the far end of the pipe follows a path. Typical of the pattern of a larger sprinkler nozzle on the far end of the pipe at certain periods of the cycle of operation to water corners. Other center pivot irrigation systems have folding end booms or sections of elongated pipe which swing outward from the main pipe to water corners.

Of course, other irrigation systems have other patterns of plural functions. Those having ordinary skill in the irrigation art will know that the object of all the functions is to evenly distribute the water on the land.

Those having ordinary skill in the agricultural irrigation business will recognize the material described in the preferred embodiment to this point is all known in the prior art.

Band 30 is attached to the end of the pipe 10 which is adjacent to the supply pipe 14. It will be understood that this end of the pipe follows a path. Spike 32 depends vertically downward from the band 30. Bracket 34 is journalled to spike 32 adjacent to band 30. The bracket 34 has arms 36 which extend horizontally outward normal to or transversely of the axis of pipe 10.

Collar 38 is journalled to spike 32 immediately below the arms 36. The collar is held in place by washer and a cotter through the spike 32. The collar has plate 40 attached thereto. The end of the plate 40 is positioned below pin 42 which extends through a hole in the plate 40 and arm 36. Therefore, it may be seen that the bracket 34 and the plate 40 rotate together about the vertical axis of the spike 32. However, the pin 42 may be removed and the plate 40 rotated to the opposite arm 36 and the pin replaced through a hole at that point thereby reorienting plate 40 by 180°, i.e., reversing the plate.

A pair of ears 44 are connected to the collar 38 immediately below the plate 40 and rigidly connected therewith. Leg 46 is connected between the ears by horizontal bolt 48. A furrow guide in the form of two discs 50 is attached to the foot of the leg 46. The leg 46 includes two portions, one telescoped within the other, and fixed by a plurality of holes through the two portions so that the length of the leg 46 may be adjusted.

Furrow 52 is plowed parallel to the path to be followed by one end of the pipe 10 in its pattern of operation. With the furrow guide in the furrow, the distance from a point of pipe to the furrow is determined by the angle between the bracket 34 and the pipe, i.e., for any fixed length of the leg 46 that the measurement or determination of the angle of the bracket 34 to the pipe will measure or determine the horizontal distance from the fixed point on the pipe 10 the furrow 52.

Pulleys 54 are mounted on the top of posts 56 on each of the arms 36 of the bracket 34. Cable 58, a mechanical transmission element, has one end attached to the pipe 10 and extends around pulley 54 on one of the arms and the other end is attached to sector 60 upon speed change mechanism of the end vehicle. Thus, the angle of the leg to the pipe is measured and mechanically transmitted to the vehicle. The sector 60 and the cable 54 are part of means for changing the variable diameter sheave and the speed of the vehicle as fully described in my U.S. Pat. No. 3,844,308. Basically, the sector is connected to a cam plate 62 which rotates about the axis of drive shaft 24 to cause the variable diameter sheave 26 located on the end vehicle 18 to expand or contract, thus changing the effective diameter of the variable diameter sheave. Therefore, it may be seen that the speed of the pipe end vehicle 18 is controlled by the horizontal distance of the end of the pipe from the furrow 52. Also, it may be seen that the movement of the sector 60 is in itself a measurement of the angle of the arm 36 which is a measurement of the distance from the fixed point on the pipe 10 to the furrow 52.

The vertical pivoting of the leg 46 about the bolt 48 provides for different elevations from the end of the pipe to the ground. Spring 68 keeps the slack out of the cable and other parts.

I prefer that the leg extend forward and angle down because experience has shown that in this position, the furrow guide almost inevitably stays within the furrow 52. If the direction of travel of the system is reversed, all that is necessary to cause the system to be guided along the furrow is to remove the pin 42 and to rotate the furrow guide so that it is again in advance of the pipe and reinsert the pin 42.

On the arm 36 opposite the cable 58 there is provided post 56 with long pulleys 54. Long cable 64, a mechanical transmission element, has one end attached to the pipe 10, then the cable 64 is trained around a first long pulley 54 back to a stationary pipe pulley 66 rigidly attached to the pipe 10 back to another long pulley 54 on another post 56 on the arm 36 and from this pulley to the far end vehicle 20. It may be seen that the long cable 64 has twice as much movement at the pipe end vehicle 18 than the cable 58 for any given angular movement of the bracket 34. Also it will be seen that the long cable 64 moves in the opposite sense from cable 58. I.e., if the cable 58 is being played out, the long cable 64 will be pulled in, and if the cable 58 is being pulled in, the long cable 64 will be played out. Long cable 64 is connected to the sector 60 of a speed change mechanism upon far end vehicle 20, thus, mechanically transmitting information to the vehicle. Therefore, since the sense of the movement of the long cable 64 is opposite to this movement of the short cable 58, that rotation of the bracket 34 will result in speed variations on both the end vehicles, but in an opposite sense. E.g., if the pipe end vehicle is being slowed down, the far end vehicle will be speeded up and, conversely, if the pipe end vehicle is being speeded up, the far end vehicle 20 will be slowed down.

It is necessary to have greater movement of the long cable 64 at the pipe end vehicle 18 because the long cable 64 has considerable stretch to it; therefore, although there is a greater movement at the pipe end vehicle, at the far end vehicle there will be about the same movement as there is of the movement of the cable 58.

Those skilled in the art will understand that with a center pivot system, the furrow guide could be attached to the outside vehicle and any of the system functions controlled by the distance from the furrow to the end of the pipe. E.g., the speed of the entire system would be changed, or the beginning or stopping of the flow from an extra nozzle at the end of the pipe could be controlled.

Referring to FIGS. 5-11, there may be seen a second embodiment of this invention. The embodiment also includes elongated pipe 70 adapted to carry sprinklers 72 thereon. Also, additional sprinklers 73 may be towed by trail tubes 75 as known before this invention. A leg in the form of pivot pipe 74 is pivoted to one end of the elongated pipe 70 by spike 76 extending through the end of the elongated pipe and the pivot pipe. The pivot pipe 74 extends to trolley 82 and is fluidly connected by flexible hose 78 to automatic valve opener 80.

The automatic valve opener 80 is carried upon the trolley 82. The trolley may be considered a two-wheeled cart. Chassis 84 of the trolley is somewhat inverted "U" shape with two stanchions 86 extending downward from cross beam 88 to wheel casters 90. Wheels 92 are journalled within the casters 90, the casters being rotatable about a vertical axis coaxial with the stanchions 86.

Furrow guide 94 (FIG. 10) includes truck 96 having a front pair of discs 98 upon the front and a back pair of discs 100 upon the back. The truck is pivoted to guide tongue 102 by kingpin 104 interconnecting the tongue and the truck. The tongue is pivoted about a horizontal axis to the casters 90.

FIGS. 5 and 11 show a simpler form of the furrow guide. In these figures, a single pair of discs 99 are connected directly to guide tongue 101, which is pivoted about a horizontal axis to the casters 90.

Guide arm 106 (FIG. 5) is rigidly attached to the end of the elongated pipe 70 and extends an equal distance on either side of the spike 76. Cable 108 extends from each end of the guide arm to the chassis 84 at the end of cross beam 88. The cross beam 88 is pivoted by trolley spike 110 to the pivot pipe 74. It may be seen that the width of the cross beam 88 is about the same as the width of the guide arm 106 and, therefore, a parallel motion linkage is formed between the elongated pipe 70 and the trolley 82. I.e., although the trolley 82 may swing from side to side with relationship to pipe end 112 of the elongated pipe 70, the cross beam will always be about parallel to the guide arm 106. The guide arm and cables have not been shown in FIGS. 8 and 10 for clarity of illustration.

The valve opener 80 is fluidly connected to the flexible hose 78 as previously stated. The valve opener 80 has been omitted from FIG. 11 for clarity of illustration; particularly is shown and details of its operation explained in my prior U.S. Pat. No. 3,444,941. The flexible hose 78 is not directly connected to the pivot pipe 74 but is connected to sand leg 114, which is fluidly connected to the pivot pipe. Therefore, should any sand accumulate it will be accumulated in the sand leg before it is conveyed into the pivot pipe 74. In this way, the pivot pipe 74 extends from the spike 76 to the trolley spike 110 and forms one of the main tension elements for towing the trolley 82 behind the elongated pipe 70.

The valve opener 80 is carried by elevator frame 116. The pipe opener is moved up and down the elevator frame by operator 118 in the form of a hydraulic cylinder. The elevator frame is held by a series of helical tension springs 120 to the main trolley frame (FIG. 11). The bottom of the elevator frame carries guides 122 for guiding the elevator frame to exact alignment with valves 124 which are connected to underground supply pipe 126. It will be understood that the trolley 82 will be guided to general alignment with the valves 124, however, for exact alignment, the elevator frame may be moved slightly one way or the other by the guides 122. The helical tension springs 120 accomodate this movement as well as the flexible hose 78. It will be understood that the guides 120 have been somewhat schematically shown in the drawings for clarity. In preferred form they are a series of tubes or pipes.

Hydraulic pump 128 is structurally attached to the elongated pipe 70 adjacent to pipe end vehicle 130. Drive connection 132 connects the pump to main drive shaft 134 which extends for the full length of the elongated pipe 70. Therefore, at all times the system is being driven forward by internal combustion engine 136, the main drive shaft 134 will be rotating and hydraulic pump 128 operating. A conventional pressure relief valve is provided to prevent the pump from producing excessive pressure, but is not shown for clarity.

Often times, it will be desirable to have a source of power in the form of hydraulic fluid under pressure available when the hydraulic pump 128 is not operating. Therefore, I place pressure accumulator 140 in the form of a small tank upon the top of pivot pipe 74 adjacent to the trolley 82 (FIGS. 10 and 11). It is connected to the hydraulic pump 128 and during the time the system is being driven forward, it will be fully pressurized. The hydraulic hoses connecting pump, accumulator to various cylinders such as operator 118 have not been shown for clarity. Those having ordinary skill in the art will understand that there will be hoses connecting these various parts and they will understand how they would be connected. However, showing the various hoses as well as electrical lines, etc., would vastly complicate and clutter the drawings so that the invention could not be discerned from them. It will be fully pressurized by being partially full of air on top and hydrualic fluid therebelow. Then after the system has stopped, the pressurized hydraulic fluid can be used to operate certain elements which are operated when the shaft 134 is not rotating such as the valve opener 80 by operator 118.

Electrical switch 142, having actuating arm with roller 144 extending upward therefrom, is attached to the pivot pipe 74 adjacent to the pipe end 112 of elongated pipe 70 (FIGS. 8, 9 and 10). Actuator plate 146 is pivoted to the elongated pipe 70 about an axis 147 parallel thereto. The actuator plate has slot 148 extending at right angles to the elongated pipe 70. If the actuator plate 146 is in the down or operating position and the pivot pipe is at right angle to the elongated pipe, the actuating arm roller 144 will be within the slot 148. If the pivot pipe 74 moves at an angle to the elongated pipe 70, the arm will move out of the slot 148 and against the bottom of the actuator plate, either to the right or left depending upon the movement of the pivot pipe (FIG. 9). It will remain either deflected to the right or the left with the roller on the actuating arm rolling against the bottom of the plate until the pivot pipe returns to a right angle position at which time the arm roller will again enter the slot. If the relative position of the electrical switch 142 moves with respect to the actuating plate 146, the arm will flop the other way and remain in that deflected position until the pipe returns to a right angle position. Therefore, it may be seen that the switch 142 will have three positions either (1) dead center, (2) deflected to the right or (3) deflected to the left. The electrical switch will determine if the pipe end 112 of the elongated pipe 70 is deflected from furrows 150 carrying furrow guide 94. Specifically, it will determine whether the pipe end 112 is above the furrows 150 and also it will determine if it is to the right or to the left. It makes this determination by in effect measuring the angle formed by the pivot pipe 74 with the elongated pipe 70.

Cable mover 152, in the form of a hydraulic cylinder, has one end attached to the elongated pipe 70 (FIG. 6). The other end is attached to roller cable block 154. Cable 156 is attached to the cable block. The cable block runs in inverted V track 159 and is held at the apex of that track by helical tension springs 160 which extend to spring frame 162 attached to the pipe 70. Solenoid valve 164 is responsive to electrical switch 142 to supply hydraulic fluid from the output of hydraulic pump 128 into one side of the hydraulic cylinder forming the cable mover 152. Solenoid valve 166 provides hydraulic fluid to the other side of the cylinder responsive to opposite actuation by electrical switch 142. If electrical switch 142 is in the neutral position, i.e., if the actuating arm roller 144 is within slot 148, then both sides of the cylinder forming cable mover 152 are inactuated. In this condition, the helical tension springs 160 will pull the cable block 154 to the apex of the track 159. Although one cable 156 has been shown in FIG. 6, it will be understood that an additional cable could extend the opposite direction to the opposite end of the vehicle but this is not shown in FIG. 6. The cables are connected to variable diameter sheaves to change the speed of the end vehicles as described above and is also described in my prior U.S. Pat. No. 3,844,308.

Electrical cable mover 168 is in the form of a electrically driven screw within a housing. One end of the electrical mover 168 is connected to elongated carriage 170. The elongated carriage is reciprocally mounted upon track 172 upon the elongated pipe 70. The other end of the electrical cable mover 168 is attached to the track 172. The cables 156 and 158 are, in this case, attached to hand winches 174 and 176 on carriage 170. The electric motor of electric cable mover 168 is controlled from the switch 142 so that it either expands if the arm roller 144 is deflected in one direction or contracts if the arm is deflected in the other direction or returns to a middle position if the arm is within slot 148. Those having ordinary skill in the electrical control arts will understand and are capable of making such connections. The cables 156 and 158 may be manually moved by the hand winches 174 and 176. Therefore, it may be seen that with the alternate cable mover that the unit may be operated automatically from switch 142 or it may be operated manually by the winches 174 and 176. Furthermore, the winches 174 and 176 may be used as an adjustment to maintain the system moving in a straight line if it appears otherwise there is excessive corrections from it deviating from the furrow 150. The cables 156 and 158 extend to the controls for variable diameter sheaves at the pipe end vehicle 130 and the far end vehicle 131 as described in the embodiments of FIGS. 1–4.

The automatic valve opener 80 upon trolley 82 operates basically in the same manner as discloses in my automatic irrigator, U.S. Pat. No. 3,444,941. Briefly, that operation is reviewed here as specifically applied to its present embodiment. A temporary platform 178 is placed around the valve 124 coming from the underground supply pipe 126. The temporary platform has grooves 180 therein to accomodate the furrow guide 94. The platform has mating surfaces 182 which snuggly fits valve 124. Therefore, the trolley 82 is guided into precise alignment with the valve 124 and the height of the trolley is closely aligned.

When the pipe 70 and trolley 82 are moving, the guides 122 guide the elevator frame 116 into exact alignment with the valve 124, pivoted lever 184 strikes the valve. Through connections, which are preferable electrical, the internal combustion engine 136 is killed thereby stopping the movement of the pipe. Also, gate 186 mounted upon the elevator frame 116 moves the elevator frame relative to the trolley so that always the valve opener 80 is aligned with the valve 124. Also, the valve opener is dropped or forced upon the valve 126 by actuation of the hydraulic operator 118 responsive to the movement of the pivoted lever 184.

Control box 188, located upon the elongated pipe 70 adjacent to pipe end 112, contains a timing mechanism. With the connection of the valve opener upon the valve, water begins to flow to the elongated pipe 70 which automatically begins the sprinkling operation. It also begins and starts the timer 190 within the control box 188.

After a preset time, such as six hours, when the land has been water sufficiently for the present position of the elongated pipe 70, the timer 190 causes the operator 118 to lift the valve opener 80 which will automatically close the valve 126. At this time the pressure relief valve in the system will maintain the pressure within the underground pipe 126 as described in my prior U.S. Pat. No. 3,444,941. Also, the lifting of the valve will lift the gate 186 so that the trolley may move forward past the valve. About 15 minutes after the valve opener 180 and gate 186 has been raised, the internal combustion engine 136 is started. Automatic starters for internal combustion engines are known. During this 15 minutes most of the water has drained from the elongated pipe 70 by automatic drain valves 192 well known to the art. About two minutes after the engine 136 is started, clutch 194 on the engine is engaged starting the main drive shaft 134 rotating and the system moving forward. The two minute delay is so that the internal combustion engine may warm up before the clutch is engaged. With the engagement of the clutch, the hydraulic pump 128 begins pumping hydraulic fluid, both to actuate the guidance control by the cable mover 152 and also to replinish the pressure accumulator 140 which was at least partially depleted by the raising of the valve opener 80 by its operator 118. After the trolley has moved a short distance, trigger 196, mounted upon the rear of the elevator frame 116, releases catch 198 to drop the gate 186 so that it is in position to again stop the elevator frame at the next valve. The trigger 196 is tripped by the valve 124 as the trolley moves away from it. As the trolley approaches the next valve 124, which also has a temporary platform 178 around it, it will be guided into accurate alignment therewith. Then, the pivoted lever 184 will again contact the new valve 124, thus, completing one cycle and beginning another.

It will be understood that the system is also well adapted for semi-automatic operation. I.e., instead of using a timer 190, the controls could be operated manually. The farmer approaches the system at the pipe end 112 and manually disengages a coupling from before, the trolley would not include the operator 118 nor the elevator frame 116 nor the gates, triggers, etc. found thereon. Then, the farmer would approach the control box 188 and manually actuate the electrical circuits which would start the motor. Then, after he had judged a reasonable time has elapsed, he could actuate other circuits to engage the clutch. Then he would walk along the system until the trolley 82 was adjacent to the next valve 124. At this point, the would manually actuate the electrical circuits to kill the engine. 136. Then, he would manually attach the coupler on the end of the flexible hose 78 with the new valve 124 again initiating operations. It may be seen with the semi-automatic operation decided there is no hydraulic circuitry used and, therefore, there is no need for the hydraulic pump and accumulator. It will be understood that with the semi-automatic operation that the electrical cable mover 168 would be used, there being electrical power available at the middle of the elongated pipe 70 where the internal combustion engine 136 is located.

Thus, it may be seen that I have provided mechanism and a procedure for evenly distributing water upon the land of an agricultural field.

The embodiments shown and described above are only exemplary. I do not claim to have invented all the parts, elements of steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

As an aid to correlating the terms of the claims to the exemplary drawing, the following catalog of elements is provided:

| | |
|---|---|
| 10 pipe | 64 cam plate |
| 12 hose | 66 stationary pulley |
| 14 supply | 68 spring |
| 16 sprinkler | 70 elongated pipe |
| 18 pipe end vehicle | 72 sprinkler |
| 20 far end vehicle | 73 added sprinkler |
| 22 intermediate vehicle | 74 pivot pipe |
| 24 drive shaft | 75 trail tube |
| 26 variable dia. sheaves | 76 spike |
| 28 valves | 78 flexible hose |
| 30 band | 80 valve opener |
| 32 spike | 82 trolley |
| 34 bracket | 84 chassis |
| 36 arms | 86 stanchions |
| 38 collar | 88 cross beam |
| 40 plate | 90 wheel casters |
| 42 pin | 92 wheels |
| 44 ears | 94 furrow guide |
| 46 leg | 96 truck |
| 48 bolt | 98 front pair of discs |
| 50 disc | 99 disc |
| 52 furrow | 100 back pair of discs |
| 54 pulley | 101 tongue |
| 56 post | 102 tongue |
| 58 cable | 104 kingpin |
| 60 sector | 106 guide arm |
| 62 cam plate | 108 cable |
| 110 trolley spike | 156 cable |
| 112 pipe end | 158 cable |
| 114 sand leg | 159 track |
| 116 elevator frame | 160 helical tension springs |
| 118 operator | 162 spring frame |
| 120 helical tension springs | 164 solenoid valve |

| -continued | |
|---|---|
| 122 guides | 166 solenoid valve |
| 124 valves | 168 electrical cable mover |
| 126 underground supply pipe | 170 elongated carriage |
| 128 hydraulic pump | 172 track |
| 130 pipe end vehicle | 174 hand winch |
| 131 far end vehicle | 176 hand winch |
| 132 drive connection | 178 temporary platform |
| 134 main drive shaft | 180 grooves |
| 136 inter. combustion engine | 182 mating surfaces |
| 140 pressure accumulator | 184 pivoted lever |
| 142 electrical switch | 186 gate |
| 144 actuating arm | 188 control box |
| 146 actuator plate | 190 timer |
| 148 slot | 192 automatic drain valves |
| 150 furrow | 194 clutch |
| 152 cable mover | 196 trigger |
| 154 roller block | 198 catch |

SUBJECT MATTER CLAIMED FOR PROTECTION

I claim as my invention:

1. In the process of operating an automatic irrigator which includes:
   a. sprinking water from an elongated pipe upon a field to be irrigated,
   b. moving said pipe traversely of its length through the field,
   c. moving a trolley along a series of main valves,
   d. attaching said trolley to said valves, and
   e. opening said valves, thus
   f. supplying water from the valves to the trolley and thus the elongated pipe;
the improved method of guiding the trolley to the valve comprising the steps of:
   g. plowing a furrow adjacent to the valves along the series of valves,
   h. placing a furrow guide on said trolley with a guide portion in said furrow,
   i. determining the horizontal distance from the furrow guide portion to the trolley,
   j. transmitting the determination of the horizontal distance to control means for moving said trolley through the field, and
   k. controlling said control means in response to the horizontal distance determination.

2. The invention as defined in claim 1 further comprising:
   j. forming a temporary platform around each valve,
   k. running said trolley onto said platform, thereby
   m. accurately aligning said trolley with said valve at each valve.

3. In the process of operating an automatic irrigator which includes:
   a. sprinkling water from an elongated pipe upon a field to be irrigated,
   b. moving the pipe transversely of its length through the field,
   c. moving the trolley along the series of main valves,
   d. attaching said trolley to said valves, and
   e. opening said valves, thus
   f. supplying water from the valve to the trolley and thus the elongated pipe;
the improved method of sequence of operation comprising:
   g. lifting a valve opener from the main valve and also lifting a gate responsive to a time period elapse, next
   h. starting an internal combustion engine responsive to a time period elapse, next
   j. engaging a clutch on the engine to a drive means to initiate the
   k. moving of said pipe, and also
   m. moving the trolley,
   n. dropping the gate upon the trolley as soon as the valve opener and gate has cleared the main valve it was previously connected to, next
   o. guiding the trolley to said next of the valves, including the steps of placing a furrow guide on the trolley with a guide portion in a furrow proximate the path followed by said trolley, determining the horizontal distance from the furrow guide portion to the trolley, transmitting the determination of the horizontal distance to control means for moving the trolley through the field, and controlling said control means in response to said horizontal distance determination, and
   p. stopping the engine when the trolley is aligned with the valve, and
   q. holding the valve opener in place by said gate, then next
   r. dropping the valve opener, thus
   s. opening said valve thus supplying the water from the valve to the trolley and the elongated pipe upon the field to be irrigated.

4. The invention as defined in claim 3 further comprising:
   t. pumping hydraulic fluid into a hydraulic accumulator at the time of engaging the clutch.

5. The invention as defined in claim 3 further comprising:
   t. placing a temporary platform around the valve before the trolley reaches the valve.

6. The invention as defined in claim 3 further comprising:
   t. draining the elongated pipe between the time the lifting of the valve opener and the engaging of the clutch.

7. In an agricultural irrigation system including:
   a. an elongated pipe adapted to carry sprinklers thereon,
   b. means attached to the pipe for supplying water under pressure to the pipe,
   c. plurality of vehicles movingly supporting the pipe, and
   d. variable diameter sheave on each of the vehicles for controlling the speed of the vehicle;
the improved structure comprising:
   e. a trolley,
   f. a pivot pipe attached to the pipe and extending to the trolley, for pulling the trolley behind the end of the pipe,
   said pivot pipe pivoted to the pipe and the trolley so that the trolley can move from side to side,
   h. parallel motion linkage in the form of cable means and the pivot pipe connecting the pipe and the trolley so that the trolley is parallel to the pipe,
   i. furrow guides mounted upon said trolley,
   j. caster mounted wheels supporting said trolley,
   k. said furrow guide attached to said caster mounted wheels to guide the trolley along a furrow,
   l. a switch interconnecting the pipe and the pivot pipe and responsive to relative angular position via linkage between the pipe and the pivot pipe,
   m. solenoid control valves on the pipe responsive to the switch, n. a fluid pressure cylinder on the pipe responsive to the control valves, o. the variable diameter sheave on at least one of the vehicles responsive to the cylinder pressure for controlling the speed of the vehicle, so that the pipe is moved to a position where the pipe and pivot pipe are perpendicular and the end of the pipe is properly oriented to the furrow.

8. The invention as defined in claim 7 further comprising:

J. a temporary platform surrounding the valve, k. so that when said trolley is aligned with the valve the trolley is upon said platform.

9. The invention as defined in claim 7 further comprising:

j. said trolley having a chassis, k. an elevator frame mounted for movement on said trolley chassis, m. said elevator frame attached by a series of springs to said chassis so that the elevator frame may move relative to the chassis, n. a pipe opener mounted upon said elevator frame, o. said elevator frame having a guide to guide the elevator frame into alignment with to a fixed valve.

10. The invention as defined in claim 9 further comprising:

p. a gate mounted on said elevator frame, q. said gate adapted to be moved into a position to contact the valve and also said gate being adapted to be in position to clear said gate so that the elevator frame and the trolley can be moved past the valve.

11. The invention as defined in claim 7 further comprising:

u. detector means to detect if the leg connecting the pipe and trolley is at an angle to said pipe and to guide the elongated pipe so that the trolley is in the desired position behind the pipe end of the elongated pipe.

12. The invention as defined in claim 11 further comprising:

v. said trolley having a chassis, w. an elevator frame mounted for movement on said trolley chassis, x. said elevator frame attached by a series of springs to said chassis so that the elevator frame may move relative to the chassis, y. the pipe opener mounted upon said elevator frame, z. said elevator frame having a guide to guide the elevator frame into alignment with to a fixed valve.

13. The invention as defined in claim 12 further comprising:

aa. a gate mounted on said elevator frame, bb. said gate adapted to be moved into a position to contact the valve and also said gate being adapted to be in position to clear said gate so that the elevator frame and the trolley can be moved past the valve.

14. In an agricultural irrigation system including a. an elongated pipe adapted to carry sprinklers thereon, b. means attached to the pipe for supplying water under pressure to the pipe, c. a plurality of vehicles movingly supporting the pipe, and d. control means on the system for evenly distributing the water on the land;

the improved structure comprising:

e. a leg pivoted about f. a vertical axis at g. the end of the pipe, and structural connection between the pipe and the leg, and h. discs attached on the end of the leg forming furrow guide means for following a furrow, and j. transmission means innerconnecting the pipe and leg responsive to the movement of the leg, k. said control means responsive to the transmission means.

15. The invention as defined in claim 14 wherein the control means includes n. a variable diameter sheave which forms a part of o. a drive mechanism on each vehicle and further comprising:

p. said transmission element is in the form of a cable extending to at least one of said variable diameter sheaves.

16. The invention as defined in claim 14 wherein n. each of said vehicles include drive means on the system for driving each vehicle, o. a pipe end vehicle on one end of the pipe and a far end vehicle on the other end of the pipe, p. intermediate vehicles between the end vehicles, q. alignment means on each intermediate vehicle for maintaining said intermediate vehicles in alignment, r. a variable diameter sheave on each vehicle which forms a part of the drive means on each vehicle and part of the alignment means on the intermediate vehicles, and further comprising:

s. a pair of arms extending transversely on the pipe attached to the leg, t. a pulley on one of the arms, u. cam means on the pipe end vehicle for changing the effective diameter of the variable diameter sheave, and v. said mechanical transmission element in the form of a cable extending from the pipe, around the pulley and to the cam means.

17. The invention as defined in claim 16 further comprising:

w. two long pulleys on the other of the arms, x. a pipe pulley on the pipe, y. cam means on the far end vehicle for changing the effective diameter of the variable diameter sheave, z. a long cable extending from the pipe trained around one of the long pulleys, the pipe pulley, the other long pulley and to the cam means on the far end vehicle.

18. In the method of operating an agricultural irrigation system including a. an elongated pipe adapted to carry sprinklers thereon, b. means attached to the pipe for supplying water under pressure to the pipe, c. a plurality of vehicles supporting the pipe, and d. control means on the system for evenly distributing the water on the land;

the improved operation comprising the steps of:

e. plowing a furrow in the soil proximate a path followed by one end of the pipe, f. placing a furrow guide at the end of the pipe with a guide in said furrow, g. determining the horizontal distance from the furrow guide to the end of the pipe with the guide thereon, h. transmitting the determination of horizontal distance to said control means, and
i. controlling said control means thereby.

19. The invention as defined in claim 18 wherein
j. said vehicles include an end vehicle adjacent to each end of the pipe, and
k. a plurality of intermediate vehicles between said end vehicles,
m. alignment means for keeping all intermediate vehicles in line between the two end vehicles;

and further comprising:
n. controlling the speed of travel of at least one of the end vehicles from the transmitting of the determination of horizontal distance.

20. The invention as defined in claim 19 further comprising:
p. changing the speed of both end vehicles, making one increase as the other decreases.

21. The invention as defined in claim 19 wherein
p. at least one end of the end vehicles is driven by mechanism which includes a variable diameter sheave;

and further comprising:
q. changing the diameter of the variable diameter sheave by said mechanically transmitted response.

22. The invention as defined in claim 21 further comprising:
r. changing the speed of both end vehicles, increasing the speed of one vehicle as the speed of the other vehicle is decreased.

23. The invention as defined in claim 18 further comprising:
j. attaching said furrow guide to a leg,
k. pivoting said leg to the end of the pipe, and
m. measuring the angle between the leg and the pipe, thus making said horizontal distance determination.

24. The invention as defined in claim 23 further comprising:
n. connecting a crossbar to the leg, and
o. thus measuring said angle.

25. The invention as defined in claim 24 wherein
p. said vehicles include an end vehicle adjacent to each end of the pipe, and
q. a plurality of intermediate vehicles between said vehicles,
r. alignment means for keeping all intermediate vehicles in line between the two end vehicles;

and further comprising:
s. controlling the speed of travel of at least one of the end vehicles from the mechanically transmitted response.

26. The invention as defined in claim 25 wherein
t. the end vehicle is driven by mechanism which includes a variable diameter sheave;

and further comprising:
u. changing the diameter of the variable diameter sheave by said mechanically transmitted response.

27. The invention as defined in claim 26 further comprising:
v. changing the speed of both end vehicles, making one increase as the other decreases.

* * * * *